United States Patent [19]

Besecke et al.

[11] Patent Number: 4,562,234

[45] Date of Patent: Dec. 31, 1985

[54] PROCESS FOR PREPARING CROSS-LINKED ACRYLIC ELASTOMERS

[75] Inventors: Siegmund Besecke, Darmstadt; Günter Schröder, Ober Ramstadt, both of Fed. Rep. of Germany

[73] Assignee: Röhm GmbH Chemische Fabrik, Darmstadt, Fed. Rep. of Germany

[21] Appl. No.: 366,670

[22] Filed: Apr. 8, 1982

[30] Foreign Application Priority Data

Apr. 9, 1981 [DE] Fed. Rep. of Germany ....... 3114266

[51] Int. Cl.$^4$ ........................................... C08F 220/06
[52] U.S. Cl. .................................... 526/241; 526/208; 526/212; 526/213; 528/220; 528/271
[58] Field of Search ............... 526/208, 212, 213, 240, 526/241; 528/220, 271, 392

[56] References Cited

U.S. PATENT DOCUMENTS

| | | | |
|---|---|---|---|
| 2,502,411 | 4/1950 | Neher et al. | 526/241 |
| 2,726,230 | 12/1955 | Carlson | 526/317 |
| 3,322,734 | 5/1967 | Rees | 526/240 |
| 3,493,550 | 2/1970 | Schmidt et al. | 526/317 |
| 3,705,137 | 12/1972 | Kuwahara et al. | 526/240 |

OTHER PUBLICATIONS

The Condensed Chemical Dictionary, 7th Edition, Published by Reinhold Publishing Corp., N.Y., (1966), pp. 1040, 1041 and 1042.

Copolymers of Butadiene and Unsaturated Acids: Crosslinking by Metal Oxides, (Journal of Polymer Science, vol. 28; pp. 195–206, (1958), W. Cooper, Dunlop Research Centre, Birmingham, England).

*Primary Examiner*—Harry Wong, Jr.
*Attorney, Agent, or Firm*—Oblon, Fisher, Spivak, McClelland & Maier

[57] ABSTRACT

An ionically cross-linked acrylic elastomer having a glass transition temperature below 30° C. is prepared by precipitation polymerization of a di- or polyvalent metal salt of acrylic, methacrylic and/or itaconic acid and/or a higher ester of methacrylic acid in an anhydrous organic solvent in which the polymer is insoluble. The metal ions comprise 0.1 to 15% of the monomer mixture.

17 Claims, No Drawings

PROCESS FOR PREPARING CROSS-LINKED ACRYLIC ELASTOMERS

BACKGROUND OF THE INVENTION

1. Field of the Invention

The invention relates to the preparation of acrylic resins having elastic properties and more particularly to the preparation of ionically cross-linked acrylic resins having elastic properties.

2. Description of the Prior Art

Synthetic resins are known to exhibit elastic properties when they are cross-linked and have a low glass transition temperature. Covalently cross-linked synthetic resins have no thermoplastic region and cannot be plastically deformed. On the contrary, ionic cross-linking is reversed upon heating and permits thermoplastic deformation.

Accordingly, it remains an objective to prepare ionically cross-linked acrylic polymers having low glass transition temperatures in powder form by a process which is technically easy to carry out.

Several multi-step processes are known for preparing ionically cross-linked acrylic polymers. In these processes an uncross-linked polymer containing carboxyl groups is first prepared, and this polymer is ionically cross-linked in a second step with a metal compound. According to U.S. Pat. No. 2,726,230, a polymer containing carboxyl groups is mixed with an oxide of a multivalent metal at elevated temperature, and heated to temperatures of 50° to 200° C. for cross-linking. In a process described by W. Cooper in *Journal of Polymer Science*, Vol. 28 (1958), pp. 195–206, this conversion is carried out in solution in an organic solvent, and the polymers cross-linked with metal are precipitated by adding a non-solvent. The object of U.S. Pat. No. 3,493,550 is an improvement of this process. A solution of a polymer containing carboxyl groups which is immiscible with water is brought into contact with an aqueous solution of a metal salt. An ionically cross-linked polymer is formed at the phase boundary and is separated in granular form.

The disadvantage of these known processes lies, on the one hand, in the multi-step, and consequently expensive, procedure, and on the other hand in the insufficient uniformity of the cross-linking. Since in all cases the metal compound acts on the already formed polymer, the cross-linking occurs at the points of contact between the polymer and the metal salt. Since a highly uniform cross-linking combined with a limited density of cross-linking is required for the preparation of elastomers, the preparation of ionically cross-linked acrylic elastomers by such a two-step process has not been reported.

A one-step process is disclosed in German OS No. 27 26 260 in which an ionically cross-linked block copolymer is obtained by polymerizing a mixture of acrylic or methacrylic acid with acrylonitrile or methacrylonitrile and a metal salt of acrylic or methacrylic acid in the absence of solvent. The highly polar monomer mixture of these acids and nitriles provides a good solvent for various metal salts, but leads to a polymeer having a very high glass transition temperature which is devoid of elastic properties at room temperature.

By the process of U.S. Pat. No. 3,705,137 a pulverulent, ionically cross-linked acrylic polymer is obtained by precipitation polymerization of a mixture of monomers of polyvalent metallic salts of acrylic or methacrylic acids and esters of acrylic of methacrylic acids. The precipitation polymerization is carried out in an aqueous-alcoholic medium containing 5 to 50% of water. This water content is indicated as indispensible in order to solubilize the salt-like cross-linker which is used in a proportion of 8 to 75 mole %, calculated on the equivalents of unsaturated acid residues. Although the basic process also permits the preparation of relatively weakly cross-linked acrylic polymers with low glass transition temperatures, all the examples are concerned only with the preparation of highly cross-linked precipitation polymers devoid of elastic properties.

In order to prepare ionically cross-linked acrylic elastomers by this process, the monomer composition must be so chosen that the glass transition temperature does not exceed 30° C., preferably 15° C., and the proportion of ionic cross-linking monomer components does not exceed 30% by weight. The metal salts of acrylic or methacrylic acids with polyvalent metal cations which are used for cross-linking are prone to hydrolysis. Consequently, they are partially hydrolyzed by the water present in the reaction mixture and in turn catalyze the hydrolysis of the acrylic ester. Both the resulting metal hydroxides and the free acrylic or methacrylic acids increase the glass transition temperature and decrease the elastic properties. Accordingly, ionically cross-linked acrylic elastomers having a sufficiently uniform cross-linking cannot be prepared by the known processes.

Hence a need has continued to exist for amethod of preparing an ionically cross-linked acrylic resin having elastic properties.

SUMMARY OF THE INVENTION

Accordingly, it is an object of the invention to provide a process for preparing ionically cross-linked acrylic polymers.

A further object is to prepare ionically cross-linked acrylic polymers having elastic properties.

A further object is to prepare ionically cross-linked acrylic polymers having thermoplastic properties.

Further objects of the invention will become apparent from the description of the invention which follows.

These and other objects of the invention are attained by a process, using a single polymerization step, in which an ionically cross-linked acrylic elastomer is prepared in powder form by:

1. preparing a monomer mixture dissolved in an organic solvent which does not dissolve or swell the polymer, said monomer mixture comprising:
    A. at least one salt, soluble in the organic solvent, of an unsaturated organic acid selected from the group consisting of acrylic acid, methacrylic acid, and itaconic acid with a metal of the second to fifth main group or the first to eighth subgroup of the periodic table of the elements, wherein at least half of the metal valences are bound to an acid, or a reaction functional equivalent mixture of corresponding proportions of the enumerated acids and a compound of the enumerated metals which is soluble in the solution of the monomer mixture and forms a salt with the acid upon heating;
    B. at least one alkyl ester of acrylic acid having 1 to 20 C-atoms in the alkyl radical or an alkyl ester of methacrylic acid having 5 to 20 C-atoms in the alkyl radical;

C. optionally, additional comonomers in subordinate amounts;

2. polymerizing the monomer mixture by a free-radical process, whereby a pulverulent polymer is precipitated from the solution, and 3. separating said pulverulent polymer; the proportion of said metal salt being 0.1 to 15%, preferably 0.2 to 10%, by weight of the monomer mixture, and the proportion of Component B being chosen so that the glass transition temperature of the polymer is below 30° C.

DETAILED DESCRIPTION OF THE INVENTION AND PREFERRED EMBODIMENTS

Surprisingly, metal compounds are available which, in spite of a large number of organic acid residues and consequently a markedly salt-type structure, are also sufficiently soluble in non-polar organic liquids in the absence of water and are suitable for use as Component A for ionic cross-linking of acrylic polymers. Consequently, they can be introduced into a substantially anhydrous organic medium for precipitation polymerization without danger of hydrolysis occurring. Thereby, even when the proportion of cross-linker is limited to at most 30%, preferably at most 20%, a uniform cross-linking is attained without impeding the control of the glass transition temperature to be less than 30° C.

The hydrolytic sensitivity of the organic-soluble metal compounds is in most cases not so great that an absolutely anhydrous organic medium is required. The water content should certainly be less than 5% and preferably less than 1% by weight, calculated on the weight of the organic liquid. The organic liquid can be comprised of one or more organic compounds which are liquid at room temperature and boil in the range between 30° and 200° C., and should neither dissolve nor swell the finished cross-linked polymer. In any case, solubility is in general not a problem because of the cross-linking. A limited uptake of the organic liquid or a component thereof is not harmful as long as the polymer is not swollen to a gelatinous state. Suitable solvents for the monomer mixture are especially aliphatic and aromatic hydrocarbons such as hexane, heptane, octane, mineral spirits, cyclohexane, benzene, toluene, ethylbenzene, xylene, and other very non-polar solvents. In general, aprotic, especially non-polar aprotic solvents are preferred. Strongly polar solvents such as methanol, ethanol, isopropyl alcohol and other lower alcohols can be used in many cases. On the contrary, solvents of intermediate polarity which have a solvent or swelling action on the uncross-linked acrylic polymer produce an undesirable swelling and aggregation of the polymer at a low degree of cross-linking. These less suitable solvents include, e.g., chlorinated hydrocarbons, ethyl acetate and acetone.

The proportions of solvent and monomer mixture are controlled principally by the conditions required for separating the precipitated polymer from the liquid phase. The separation is easily carried out industrially by filtration, decantation, or centrifugation, when the proportion of the precipitation polymer amounts to 1 to 10% by weight of the organic medium. The monomer solution used should have the corresponding proportions. When the proportion of solvent is lower, the reaction produuct is a slurry and is difficult to handle, while at higher proportions of solvent, unnecessarily large volumes of liquid have to be handled.

The metal salts used as Component A of the monomer mixture are soluble in organic solvents to different degrees and therefore are not equally suitable for each case. In order to attain a high degree of cross-linking a more soluble metal compound must be used than when a low degree of cross-linking is to be attained within the limits of the claimed process. The least preferred metals are those of the second main group of the periodic table, i.e., the alkaline earth metals, whose acrylic acid and methacrylic acid salts are somewhat lacking in solubility. The magnesium salts are soluble in the presence of tetraalkyl titanates. A preferred group of metal cations are those of the third to fifth main group or the second to seventh subgroup of the periodic table as well as the magnesium cation. Among the metal cations of these groups the cations of the elements Mg, Al, Si, Sn, Pb, Zn, Ce, Ti, Zr, Hf, Ta and Cr are preferred. With regard to solubility and cross-linking activity, the cations of zinc, aluminum, tin, silicium, lead, hafnium, titanium, and zirconium are especially preferred. Titanium, zirconium and hafnium cations have especially strong complex-forming tendencies and accordingly can be incorporated into very soluble complexes. Consequently, these cations are the most preferred for the process of the invention. Zirconium tetracrylate and tetramethacrylate are the most suitable metal compounds. Various metal cations can also be used in combination.

Insofar as the metal salts of acrylic or methacrylic acid are industrially available and soluble in the monomer mixture in sufficient concentration, they can be used as such as cross-linking agents. Examples of such salts are zinc acrylate and methacrylate, zirconium acrylate and methacrylate and lead acrylate and methacrylate. They can also be in the form of basic salts, as, for example, chromium (III) hydroxide dimethacrylate, which is readily soluble in acrylic and methacrylic esters. In many cases, of course, the metal salts of acrylic or methacrylic acid are difficult to prepare or are not soluble in the monomer mixture in the required concentration. In these cases free acrylic or methacrylic acid is used for the polymerization together with a compound of the metal which is soluble in the monomer mixture in the required concentration. Generally, the metal compound is used in such proportion that the equivalent amount of the metal cation is at most equal to the acid equivalent of the acrylic or methacrylic acid. The metal compounds which can be dissolved in the monomer mixture include the chlorides, the carbonates, the salts of organic carboxylic acids, especially the acetylacetonates, and the alcoholates, such as propylates and butylates. Preferred metal compounds are the acetylacetonates, propylates, butylates and chlorides of tin, chromium, zirconium, titanium, aluminum and zinc.

Frequently, it is not immediately possible to determine in which form the metal cation is bound during or after the polymerization. The conversion into cross-linking acrylic or methacrylic acid salts or polymerized residues thereof, which are the cross-linking bridges, first occurs in many cases upon heating to temperatures over 100° C. This is recognized, e.g., by a color change or an alteration of the mechanical or solubility properties.

The metal compounds used as Component A of the monomer mixture raise the glass transition temperature. In order to achieve a sufficiently low glass transition temperature for the precipitation polymer, monomers which lower the glass transition temperature also have to be used in sufficient amount. According to the process of the invention such monomers are the alkyl esters of acrylic acid having 1 to 20 C-atoms in the alkyl radical and the alkyl esters of methacrylic acid having 5 to 20 C-atoms in the alkyl radical. In general, the alkyl esters of acrylic acid give better elastic properties than the methacrylic acid esters and therefore they preferably make up the predominant portion of Component B. Preferred esters are methyl, ethyl and butyl acrylates and $C_8$–$C_{14}$-alkyl methacrylates.

Insofar as the glass transition temperature allows, additional comonomers can be used in subordinate proportions as Component C of the monomer mixture. Examples of such comonomers are the lower esters of methacrylic acid, hydroxyalkyl esters or aminoalkyl esters of acrylic or methacrylic acid, acrylonitrile or methacrylonitrile, styrene, vinylpyrrolidone, vinylimidazole, maleic, fumaric or itaconic acids and their derivatives. The proportion of these comonomers C preferably amounts to no more than 20% by weight of the monomer mixture.

The polymerization mixture composed of the monomer mixture and the solvent should be homogeneous and in a state of complete solution at least at the polymerization temperature. The polymerization is initiated by soluble organic free-radical initiators. The conventional peroxides or azo compounds such as dibenzoyl peroxide, dilauroyl peroxide, diisopropyl percarbonate, tert-butyl permaleate, peroctoate, or perpivalate, azobisisobutyronitrile or azobis(ethyl isobutyrate) can be used for this purpose in amounts of, e.g., 0.05 to 4% by weight. The polymerization is in general conducted in the temperature range of 50° to 120° C., optionally using a redox initiator system. Conventional regulators can be employed to control the degree of polymerization of the principal chain. During the polymerization the cross-linked polymer precipitates in the form of finely divided powder. In the process plasticizers, processing aids, coloring agents or other additives, as, for example, stearic acid, can be coprecipitated at the same time. In order to achieve a complete reaction of the monomers, it is advantageous to raise the polymerization temperature somewhat toward the end of the reaction. Polymerization yields of more than 95% of theoretical, generally more than 99% of theoretical, are attainable. The polymer can be separated from the organic medium by centrifugation or filtration and freed from the rest of the volatile solvent by drying, optionally in vacuum or at elevated temperature.

The polymerization process can be conducted by a preparative procedure in which the polymerization mixture comprised of a solvent and the monomer mixture is placed in a stirred reactor and heated to the polymerization temperature. During the polymerization the heat of reaction is removed by cooling, in order to assure a uniform course of reaction. The stirring should be sufficient or prevent the deposition of the precipitated polymer in the reaction vessel. For this purpose, limited amounts of dispersants can also be used.

In an especially preferred embodiment of the process at least a portion of the monomer mixture, as such or dissolved in the solvent, is added to the polymerization mixture during the course of the polymerization. By this procedure a uniform composition of the polymer is assured throughout the duration of the process, especially when the rate of addition is generally adjusted to the rate of polymerization. After the addition of the entire monomer mixture the temperature can again be somewhat increased, as in the procedure wherein all ingredients are initially in the reactor, for the final polymerization. The process can also be conducted continuously, wherein the monomer mixture dissolved in a solvent is continuously added and an equivalent amount of the continuously formed precipitation polymer slurry is simultaneously withdrawn. In order to react completely the monomer portion still present in the withdrawn slurry it is advantageous to pass it through a stirred post-reactor operated at a somewhat higher temperature. The slurry leaving the post-reactor can be fed to a continuous filter or continuous centrifuge. The residual solvent, after optional purification, can be recycled to the process for use in preparing the polymerization mixture. The dried pulverulent polymer can be compressed to a homogeneous and essentially clear elastic material by pressing at 20° to 250° C. The properties can be modified if the pulverulent polymer is mixed with fillers such as, e.g., finely divided silicica, powdered mica or metal oxides before pressing. The fillers can optionally comprise the predominant portion of the mixture.

Having generally described the invention, a more complete understanding can be obtained by reference to certain specific examples, which are provided herein for purposes of illustration only and are not intended to be limiting unless otherwise specified.

EXAMPLE 1

600 parts by weight of cyclohexane were heated to 50° C. and a mixture of 200 parts by weight of ethyl acrylate, 27.6 parts by weight of methacrylic acid, 30.6 parts by weight of zirconium (IV) butylate and 2 parts by weight of tert-butyl perpivalate was added dropwise thereto under an argon atmosphere over a period of 2 hours with vigorous stirring. The mixture was then stirred for an additional 3 hours at 50° C.

The precipitated polymer (pulverulent-granular) was filtered off, washed with cyclohexane, and dried at 50° C. under vacuum. Yield: 245 g=97.2% of theoretical.

The polymer could be compressed with heating to a clear, weakly elastic sheet and after cooling to −40° C. could be repulverized.

EXAMPLE 2

To 700 parts by weight of a toluene/cyclohexane mixture (50:50 parts by volume), a mixture of 256 parts by weight of butyl acrylate, 27.6 parts by weight of methacrylic acid, 30.6 parts by weight of zirconium (IV) butylate and 2.6 parts by weight of tert-butyl perpivalate was added dropwise over a period of 1.5 hours under an inert atmosphere at 80° C. The mixture was then stirred for 3 hours at 80° C.

The reaction mixture was concentrated, and the precipitated polymer was separated, washed with toluene and dried. Yield: 308 g= >99% of theoretical.

EXAMPLE 3

By a procedure analogous to that of Example 1 the following monomer mixture was polymerized.

200 parts by weight ethyl acrylate
23 parts by weight acrylic acid
39 parts by weight zirconium (IV) acetylacetonate A pulverulent polymer was formed which after filtering, washing and drying could be compressed to a clear elastic sheet.

Having now fully described the invention, it will be apparent to one of ordinary skill in the art that many changes and modifications can be made thereto without departing from the spirit or scope of the invention as set forth herein.

What is claimed as new and sought to be protected by Letters Patent of the United States is:

1. A process for preparing a pulverulent, ionically cross-linked acrylic elastomer, which can be compressed to a homogeneous and essentially clear elastic material by pressing at 20° to 250° C. comprising:
   (i) preparing a solution of a mixture of monomers comprising:
       (A) a mixture of a chloride, carbonate, organocarboxylate, acetylacetonate, or alcoholate zirconium compound and at least one acid selected from the group consisting of acrylic acid, and methacrylic acid, said compound and said at least one acid being present in amounts such that a zirconium salt product is formed upon heating wherein more than half of the valences of said zirconium are bound to the anion formed from said unsaturated carboxylic acid; and
       (B) at least one alkyl ester of acrylic acid having 1 to 20 carbon atoms in the alkyl group, or an alkyl ester of methacrylic acid having 5 to 20 carbon atoms in the alkyl group in a substantially anhydrous organic solvent selected from the group consisting of aliphatic hydrocarbons, aromatic hydrocarbons and alcohols which does not dissolve or swell said cross-linked acrylic elastomer, the proportion of the zirconium ion of said salt in said monomer mixture being 0.1 to 15% by wt. of the monomer mixture and the proportion of component B being chosen so that the glass transition temperature of said elastomer is less than 30° C.;
   (ii) polymerizing said monomer mixture by a free radical process with heat to form a pulverulent polymer; and
   (iii) precipitating and separating said pulverulent polymer.

2. The process of claim 1, wherein said monomer mixture additionally comprises at least one radically polymerizable, ethylenically unsaturated monomer selected from the group consisting of lower esters of methacrylic acid other than the methacrylate component of group B, hydroxyalkyl esters and aminoalkyl esters of (meth)acrylic acid, acrylonitrile, methacrylonitrile, styrene, vinyl pyrrolidone, vinyl imidazole, maleic acid, fumaric acid, and itaconic acid in amounts no greater than 20% of said monomer mixture.

3. The process of claim 1, wherein the proportion of said zirconium ion in said monomer mixture ranges from 0.2 to 10% by weight.

4. The process of claim 1, wherein said monomer mixture of step (i) is at least in part added to polymerization of step (ii) during polymerization.

5. The process of claim 1, wherein said zirconium salt after it has been formed in the monomer mixture of step (i) comprises 0.5 to 20% by weight of the monomer mixture of step (i).

6. The process of claim 5, wherein said zirconium salt comprises 1 to 15% by weight of the monomer mixture of step (i).

7. The process of claim 1, wherein, in component A, one mole of said unsaturated acid is combined with an equivalent weight of zirconium in said zirconium compound.

8. A pulverulent ionically crosslinked acrylic elastomer, which can be compressed to a homogeneous and essentially clear elastic material by pressing at 20° to 250° C., prepared by a process comprising:
   (i) preparing a solution of a mixture of monomers comprising:
       (A) a mixture of a chloride, carbonate, organocarboxylate, acetylacetonate or alcoholate zirconium compound and at least one acid selected from the group consisting of acrylic acid, and methacrylic acid, said compound and said at least one acid being present in amounts such that a zirconium salt product is formed upon heating wherein more than half of the valences of said zirconium are bound to the anion formed from said unsaturated carboxylic acid; and
       (B) at least one alkyl ester of acrylic acid having 1 to 20 carbon atoms in the alkyl group or an alkyl ester of methacrylic acid having 5 to 20 carbon atoms in the alkyl group, in a substantially anhydrous organic solvent selected from the group consisting of aliphatic hydrocarbons, aromatic hydrocarbons and alcohols which does not dissolve or swell said crosslinked acrylic elastomer, the proportion of the zirconium ion of said salt in said monomer mixture being 0.1 to 15% by wt. of the monomer mixture and the proportion of component B being chosen so that the glass transition temperature of said elastomer is less than 30 C;
   (ii) polymerizing said monomer mixture by a free radical process with heat to form a pulverulent polymer; and
   (iii) precipitating and separating said pulverulent polymer.

9. The elastomer of claim 8, wherein said monomer mixture additionally comprises at least one radically polymerizable, ethylenically unsaturated monomer selected from the group consisting of lower esters of methacrylic acid other than the methacrylate component of group B, hydroxyalkyl esters and aminoalkyl esters of (meth)acrylic acid, acrylonitrile, methacrylonitrile, styrene, vinyl pyrrolidone, vinyl imidazole, maleic acid, fumaric acid and itaconic acid in amounts no greater than 20% of said monomer mixture.

10. The elastomer of claim 8, wherein the proportion of said zirconium ions in said monomer mixture ranges from 0.2 to 10% by weight.

11. The elastomer of claim 8, wherein said monomer mixture of step (i) is at least in part added to polymerization step (ii) during polymerization.

12. The elastomer of claim 8, wherein said zirconium salt after it has been formed comprises 0.5 to 20% by weight of the monomer mixture of step (i).

13. The elastomer of claim 12, wherein said zirconium salt comprises 1 to 15% by weight of the monomer mixture of step (i).

14. The elastomer of claim 8, wherein, in component A, one mole of said unsaturated acid is combined with an equivalent weight of zirconium in said zirconium compound.

15. The process of claim 1, wherein the water content of said substantially anhydrous organic solvent is less than 5% by weight.

16. The process of claim 15, wherein said water content is less than 1% by weight.

17. The elastomer of claim 8, wherein the water content of said substantially anhydrous organic solvent is less than 5% by weight.

* * * * *